United States Patent

Schmidt, Jr.

[11] 4,094,790
[45] June 13, 1978

[54] DISTRIBUTOR COLLECTOR ASSEMBLY

[75] Inventor: Henry Schmidt, Jr., Hinsdale, Ill.

[73] Assignee: Industrial Filter & Pump Mfg. Co., Cicero, Ill.

[21] Appl. No.: 740,815

[22] Filed: Nov. 11, 1976

[51] Int. Cl.² ............................................. B01D 23/20
[52] U.S. Cl. ..................................... 210/289; 210/291; 210/497 R
[58] Field of Search ............... 210/279, 289, 291, 292, 210/293, 323 T, 497 R, 497.1; 261/121 R, 124

[56]  References Cited

U.S. PATENT DOCUMENTS

| 2,268,607 | 1/1942 | McGill | 210/279 X |
| 2,586,620 | 2/1952 | De Hart | 261/124 X |
| 3,189,181 | 6/1965 | Couse | 210/291 |
| 3,208,935 | 9/1965 | Nesbitt | 261/124 X |
| 3,394,815 | 7/1968 | Harms et al. | 210/497 X |
| 3,503,516 | 3/1970 | Harms et al. | 210/323 T |
| 3,532,216 | 10/1970 | Zievers et al. | 210/289 X |
| 3,556,299 | 1/1971 | Zievers et al. | 210/279 X |
| 3,625,365 | 12/1971 | Armstrong et al. | 210/279 X |
| 3,685,657 | 8/1972 | Hunter et al. | 210/289 |
| 3,771,664 | 11/1973 | Schrink et al. | 210/445 X |
| 3,774,769 | 11/1973 | Smith | 210/445 X |
| 3,779,386 | 12/1973 | Ryan | 210/497 X |
| 3,890,236 | 6/1975 | Harrell | 210/497 X |

FOREIGN PATENT DOCUMENTS

| 1,342,082 | 12/1973 | United Kingdom | 210/279 |

Primary Examiner—Charles N. Hart
Assistant Examiner—Robert H. Spitzer
Attorney, Agent, or Firm—Edmond T. Patnaude

[57]  ABSTRACT

An axially rigid, tubular grid is fitted over an apertured conduit; a fine mesh flexible tube is fitted over the grid with the ends of the tube being folded back over annular sealing gaskets disposed at the ends of the grid; and an end cap is threaded onto the distal end of the conduit to compress the gaskets against the conduit at the ends of the grid to seal the ends of the flexible tube to the conduit.

9 Claims, 3 Drawing Figures

DISTRIBUTOR COLLECTOR ASSEMBLY

The present invention relates in general to a novel filter cartridge construction and to a novel distribution or a collection system for use in a processing vessel and incorporating the said cartridge.

BACKGROUND OF THE INVENTION

Processing columns commonly contain a bed of granular material such, for example, as resin, through which a liquid is passed to treat either the liquid or the granular material. In order to distribute the liquid uniformly to the bed, a plurality of interconnected apertured conduits are ordinarily arranged across either the top or bottom of the bed on the upstream side thereof. In like manner the liquid which has passed through the bed may be collected by a similar arrangement of apertured tubes on the downstream side of the bed. In many processes the same tubes are used both for purposes of distribution and collection in different steps of the process.

In order to prevent the granular material from exiting the processing vessel along with the liquid, the distributor-collector conduits are ordinarily covered with a filter media such, for example, as a tube of fine mesh woven cloth. In order to maintain the integrity of the seals between the ends of the cloth tube and the underlying apertured conduit, metal clamps which tightly compress the end portions of the cloth tube against resilient rings disposed on the conduits have generally been used.

Inasmuch as many processes involve the treatment of liquids which are corrosive to most metals or which themselves become contaminated by most metals, it would be desirable to provide a distributor-collector system which may be made entirely of plastic or other inert material and yet maintains the integrity of the seals between the filter cloth and the underlying conduit. Also, it would be desirable to provide a distributor-collector system which may be easily disassembled for maintenance and replacement of the fine mesh cloth tube when necessary.

Many distributor-collector systems are custom designed for particular applications. Accordingly, maintaining an inventory of such parts for replacement or repair is necessarily costly. It would, therefore, be desirable to provide a distributor-collector system utilizing only standard parts but adaptable to use in various custom engineered applications.

SUMMARY OF THE INVENTION

Briefly, there is provided in accordance with the present invention a distributor-collector assembly which may be constructed of only plastic or similar non-metallic structural components. This novel construction incorporates a coarse, axially rigid, tubular grid slidably positioned on a rigid, apertured conduit. A fine mesh flexible tube of filter cloth is fitted over the grid with the ends of the tube being folded back over resilient rings which fit over the ends of the conduit beyond the ends of the grid. Compression sleeves slidably fit over the ends of the conduit and are provided with counterbores which receive and compress the rings and overlapping portions of the cloth tube against the conduit to seal the end portions of the cloth tube to the conduit. A cap threaded over one end of the conduit sealably closes the end of the conduit and also compresses the compression sleeves into sealing relationship with the cloth tube.

GENERAL DESCRIPTION OF THE DRAWING

Further objects and advantages and a better understanding of the present invention can be had by reference to the following detailed description, wherein.

DETAILED DESCRIPTION OF THE INVENTION

Figure 1:
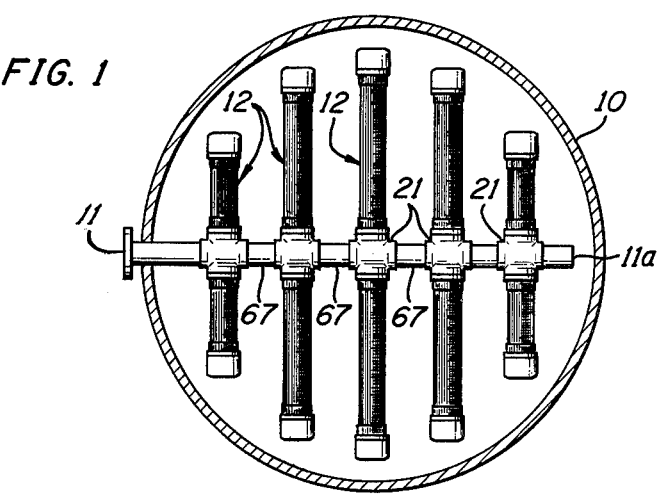
FIG. 1 is a horizontally sectioned view of a processing vessel embodying the present invention.

Referring to the drawings and particularly to FIG. 1 thereof, a processing vessel 10 in the form of a vertical column is generally cylindrical and adapted to contain a bed of granular material (not shown) for contact with a liquid passing in a generally vertical direction through the bed. In order to introduce liquid to one end of the column and/or to collect liquid from one end of the column, a tubular manifold or header 11 extends diametrically across the column near either the top or bottom and a plurality of perforate distributor-collector assemblies 12 extend laterally from the manifold. The assemblies 12 are tubular with the distal or outer ends of the assemblies 12 being sealably closed. The inner ends of the assemblies 12 are mounted to the manifold with the cavities in the assemblies 12 in communication with the passageway through the manifold 11. The manifold 11 extends through the wall of the column 10 with the inner end 11a thereof being sealably closed. When liquid is supplied to the column through the manifold 11 it is thus distributed to the bed through the assemblies 12. When liquid is removed from the column 10 through the manifold 11 it is collected from the bed by the assemblies 12.

Figure 2:
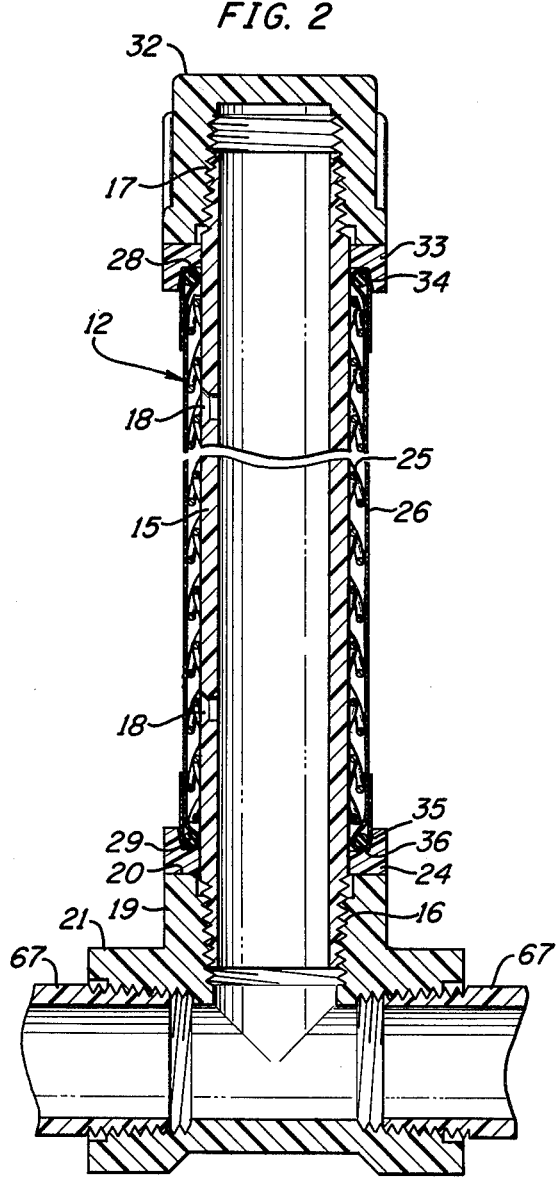
FIG. 2 is a longitudinally sectioned view of a distributor-collector conduit embodying the present invention.

The present invention relates to the construction of the distributor-collector assemblies 12 and to the combination of the assemblies 12 and the manifold 11. With referance to FIG. 2, a rigid pipe or conduit 15 is externally threaded at the inner and outer ends 16 and 17 and provided with a row of apertures 18 through the wall thereof. The inner end 16 is threaded into an internally threaded hole in a boss 19 on a plastic fitting 21. A flat annular shoulder 20 on the end of the boss 19 lies perpendicular to the longitudinal axis of the conduit 15.

A compression ring or sleeve 24 slidably fits on the conduit with the inner end thereof in abutting relationship with the shoulder 20. A coarse plastic grid 25 of tubular construction is slidably fitted on the conduit 15 with the ends of the grid 25 spaced from the ends of the underlying conduit 15. The grid 25 is substantially non-compressible in an axial direction and is preferably of the construction shown in FIG. 7 of U.S. Pat. No. 3,556,299.

A tube 26 of fine mesh flexible material, such as woven cloth is fitted over the tubular grid 25 to provide the perforate surface which intercepts the entrained solids in the liquid passing therethrough. The tube 26 is longer than the grid 25 and the extending ends are respectively folded back on themselves over a pair of resilient annular gaskets 28 and 29 located on the conduit 15 at the respective ends of the grid 25.

In order to sealably close the outer or distal end of the conduit 15 and to apply a compressive force to seal the filter cloth 26 to the conduit 15 beyond the ends of the grid 25, a cap 32 is threaded onto the distal end of the conduit 15 and a second compression ring or sleeve 33 is positioned between the inner annular end of the cap 32 and the gasket 28. The sleeves 24 and 33 are counterbored to provide annular grooves 34 and 35 which receive the gaskets and the folded over portions of the tube 26. As the cap 32 is thus tightened down on the conduit 15 the gaskets 28 and 29 are compressed between the ends of the grid and the sleeves 24 and 33. Because of the retaining grooves 34 and 35, the gaskets and overlying portions of the cloth tube 26 are sealably compressed against the conduit 15. Accordingly all liquid flow into or out of the conduit 15 is through the cloth filter tube 26.

In order to assure a satisfactory seal at the ends of the grid 25, the outer walls 36 of the counterbores 34 and 35 are outwardly divergent so as to increase the compression of the gaskets as they bottom in the retaining grooves during tightening of the end cap 32.

Figure 3:
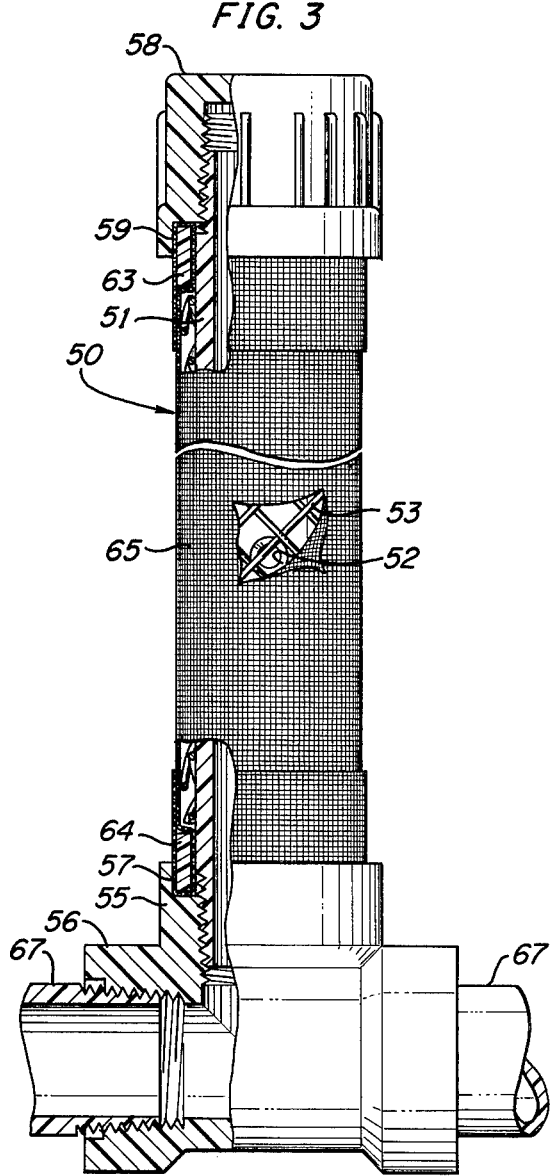
FIG. 3 is a partially broken away, partially sectioned view of another distributor-collector assembly embodying the present invention.

Referring to FIG. 3 there is shown an alternative embodiment of the invention. As there shown, a distributor-collector assembly 50 comprises a plastic conduit 51 provided with a row of apertures 52 and over which a course, tubular plastic grid 53 is fitted. The conduit 51 is externally threaded at both ends with the inner end threaded into a boss 55 on a plastic pipe connector 56. As shown, a counterbore 57 is provided in the boss 55.

A cap 58 is threaded onto the outer or distal end of the conduit 51 and is provided with a counterbore 59 at the lower end as shown in FIG. 3. The grid 53 being a compression member is axially rigid like the grid 25 in the embodiment of FIG. 2.

A pair of generally cylindrical resilient gaskets 63 and 64 are positioned at the ends of the grid 53 and the ends of a fine mesh flexible tube 65 are fitted over the grid 53 are folded back on themselves over the gaskets 63 and 64. In this embodiment of the invention the rings 24 and 33 are not used. In other respects, however, the assembly 50 functions the same as the assembly 12.

There is thus provided in accordance with the present invention a novel distributor-collector assembly which need not incorporate any metallic parts. The units 12 may be quickly and easily disassembled for cleaning and replacement of worn out parts. Moreover, the assemblies may be built up in the field by simply cutting and tapping the desired lengths of conduit. In this manner changes in the lengths of the distributor-collector assemblies may be quickly made. In addition, the required inventory of spare or replacement parts is minimized.

As best shown in FIG. 1, the overall distributor-collector assembly is made up of a plurality of connectors 21 and short lengths of plastic pipe 67 connected therebetween. Accordingly, the assembly itself can be readily custom built in the field from conventional plastic pipe or conduit and conventional plastic tee-shaped three-way connection or the four-way connection 21 as shown.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. In combination
   a rigid conduit provided with a plurality of apertures in the wall thereof and having an end portion,
   an axially rigid tubular grid fitted over said conduit, said end portion of said conduit extending beyond one end of said grid,
   an annular, resilient sealing gasket positioned over said tube and said conduit adjacent to and beyond said one end of said grid, one end portion of said tube being folded back on the external side of itself over said gasket, and
   internally screw threaded closure means secured to said end of said conduit for sealing said end of said conduit,
   said closure means having an annular skirt portion extending over said gasket and overlying portions of said tube for compressing said gasket and overlying portions of said tube into sealing relationship with said conduit.

2. The combination according to claim 1, wherein said closure means comprises
   a sleeve fitted on said conduit adjacent said one end of said grid, said sleeve having a counterbore facing said grid and receiving said gasket and the folded over portion of said tube.

3. The combination according to claim 1 comprising a manifold,
   said conduit being threadedly secured to said manifold,
   a shoulder on said manifold facing said grid, and
   means sealing said tube to conduit adjacent said shoulder.

4. The combination according to claim 1,
   said skirt portion having an outwardly divergent inner annular wall surface which engages said tube and compresses it and said gasket against said conduit as said closure means is threaded into said conduit.

5. In combination,
   a plurality of lengths of plastic tubing,
   a plurality of plastic connectors sealably connected between respective lengths of said tubing, and
   a plurality of the combinations of claim 1 wherein each said conduit is sealably connected to one of said connectors.

6. In combination
   a rigid conduit provided with a plurality of apertures in the wall thereof,
   an axially rigid tubular grid fitted over said conduit, said conduit extending beyond one end of said grid,
   a fine mesh flexible tube fitted over said grid and extending beyond said one end of said grid,
   an annular, resilient sealing gasket positioned over said tube adjacent said one end of said grid, one end portion of said tube being folded back on itself over said gasket,
   closure means threaded on the end of said conduit for sealing said end of said conduit and for compressing said gasket and overlying portions of said tube into sealing relationship with said conduit,
   a manifold,
   said conduit being threadedly secured to said manifold,
   a shoulder on said manifold facing said grid, means sealing said tube to said conduit adjacent said shoulder, and said means sealing said tube to said conduit including a sleeve surrounding said conduit and abutting said shoulder, a counterbore in said sleeve facing toward said grid, a second annular, resilient sealing gasket, the other end portion of said tube being folded back on itself over said second gasket, and said second gasket and the portion of said tube folded thereover being disposed between the other end of said grid and said shoulder in said counterbore in said second sleeve.

7. The combination according to claim 6 wherein said gaskets are held under compression between said sleeves and the respective ends of said grid.

8. The combination according to claim 7 wherein said gaskets, when in the relieved state, are circular in cross-section.

9. In combination, a plurality of lengths of plastic tubing, a plurality of plastic connectors sealably connected between respective lengths of said tubing, and a plurality of the combinations of claim 7 wherein each said conduit is sealably connected to one of said connectors.

* * * * *